United States Patent
Buten (10) Patent No.: US 8,444,418 B1
(45) Date of Patent: May 21, 2013

(54) METHODS, SYSTEMS, KITS AND COMPUTER USABLE MEDIA FOR SIMULATING FINANCIAL TRANSACTIONS

(75) Inventor: David R. Buten, Cincinnati, OH (US)

(73) Assignee: ProperLiving, LLC, Cincinnati, OH (US)

( * ) Notice: Subject to any disclaimer, the term of this patent is extended or adjusted under 35 U.S.C. 154(b) by 1011 days.

(21) Appl. No.: 11/433,208

(22) Filed: May 12, 2006

(51) Int. Cl.
*G06Q 40/00* (2012.01)

(52) U.S. Cl.
USPC ............... 434/107; 434/110; 705/35; 705/42

(58) Field of Classification Search
USPC ............. 705/35, 42; 706/47; 434/107, 110
See application file for complete search history.

(56) References Cited

U.S. PATENT DOCUMENTS

| | | | |
|---|---|---|---|
| 4,804,741 A | 2/1989 | Verbiscar et al. | |
| 5,014,362 A | 5/1991 | Tillotson et al. | |
| 5,429,373 A | 7/1995 | Chelko et al. | |
| 5,580,942 A | 12/1996 | Cornish | |
| RE35,616 E | 9/1997 | Tillotson et al. | |
| 5,699,528 A * | 12/1997 | Hogan | 705/40 |
| 5,716,211 A | 2/1998 | Vetter | |
| 5,717,050 A | 2/1998 | Cornish | |
| 5,927,987 A | 7/1999 | Berman | |
| 5,998,512 A | 12/1999 | Schloman | |
| 6,054,525 A | 4/2000 | Schloman, Jr. et al. | |
| 6,106,300 A * | 8/2000 | Kiyosaki et al. | 434/107 |
| 6,224,381 B1 * | 5/2001 | Culberson et al. | 434/110 |
| 6,375,466 B1 | 4/2002 | Juranovic | |
| 6,535,861 B1 * | 3/2003 | O'Connor et al. | 706/11 |
| 6,767,210 B2 * | 7/2004 | Joffe | 434/107 |
| 6,890,179 B2 | 5/2005 | Rogan et al. | |
| 7,752,102 B2 * | 7/2010 | Thomas | 705/35 |
| 2002/0069189 A1 | 6/2002 | Bertrand | |
| 2002/0164561 A1 | 11/2002 | Joffe | |
| 2003/0212636 A1 * | 11/2003 | Resnick | 705/42 |
| 2004/0076931 A1 * | 4/2004 | Rogan et al. | 434/107 |
| 2004/0081942 A1 | 4/2004 | Resnick | |
| 2004/0157194 A1 | 8/2004 | Libby | |
| 2005/0069841 A1 | 3/2005 | Lee | |
| 2005/0079471 A1 | 4/2005 | Rogan et al. | |
| 2007/0135191 A1 * | 6/2007 | Baker et al. | 463/1 |

OTHER PUBLICATIONS

Donnell, Jean; Living on You Own: An independent Living Simulation, 2nd ed. Watch Publishing 2001.*
Bunnell, Jean; Living on You Own: An independent Living Simulation, 2nd ed. Teachers Guide. Watch Publishing 2001.*

(Continued)

*Primary Examiner* — Kito R Robinson
(74) *Attorney, Agent, or Firm* — Wood, Herron & Evans, LLP (57) ABSTRACT

A method of teaching personal financial skills to a student includes providing a balance of simulated funds within a simulated bank account. Simulated bills are transmitted to a student on a periodic basis via at least one of a courier and an electronic transmission, wherein at least some of the simulated bills are transmitted on different dates and impose different due dates. Simulated payments are received from a student corresponding to the simulated bills via at least one of a courier and an electronic transmission. The simulated payments are processed upon receipt and the balance of the simulated funds is reconciled within the simulated bank account to reflect the simulated payments. A computer usable media having encoded thereon a computer implemented method for simulating financial transactions is also provided. System and kits are also provided.

11 Claims, 12 Drawing Sheets

OTHER PUBLICATIONS

Information pertaining to www.parentware.com was archived Feb. 17, 2005 at http://web.archive.org/web/20050217041339/www.parentware.org/FAQ.htm by use of www.archive.org retrieved Jul. 23, 2008.*

Bunnell, Jean; Living on You Own: An independent Living Simulation, 2nd ed. Teacher's Guide. Watch Publishing 2001.*

Money matters to these students. (Feb. 3, 2006). The Evening Sun. Retrieved Jan. 11, 2013.*

Cornish, Katrina., et al., "Absence of cross-reactivity between natural rubber latex from production lots of *Hevea brasiliensis* (Hev-b) and *Parthenium argentatum* (guayule)", presentation, Sep. 17-21, 2005, pp. 565-574, Proceedings of 2005 Ann Mtg of Assoc for Advance of Industrial Crops, Murcia, Spain.

Cornish, K., et al., "Fundamental similarities in rubber particle architecture and function in three evolutionarily divergent plant species", article, 1993, 275-85, J Natural Rubber Res, v 8(4).

Cornish, K., et al., "Guayule latex provides a solution for the critical demands of the non-allergenic medical products market", article, Nov./Dec. 2001, pp. 27-31, Agro Food Industry hi-tech, anno 12, No. 6, Teknoscienze, Milan.

Cornish, K., et al., "Latex quantification in guayule shrub and homogenate", article, Jan. 25, 1999, pp. 121-136, Ind Crops & Prod, v 10 (1999), Elsevier Science.

Cornish, K., et al., "Latex yield and quality during storage of guayule (*Parthenium argentatum* Gray) homogenates", article, Dec. 1, 2003, pp. 75-85, Ind Crops & Prod, v 22 (2005), Elsevier Science.

Cornish, K., et al., "Post-harvest stability of latex in different sizes of guayule branches", article Jul. 26, 1999, pp. 25-32, Ind Crops & Prod, v 12 (2000), Elsevier Science.

Cornish, K., et al., "Purification of hypoallergenic latex from guayule", presentation, Trends in New Crops & New Uses, Nov. 10-13, 2001, pp. 226-233, proceedings of 5th Natl Symp, Atlanta, GA.

Cornish, K., et al., "Some rheological properties of latex from *Parthenium argentatum* Gray compared with latex from *Hevea brasiliensis* and *Ficus elastica*", article, Apr. 2002, pp. 13-18, J of Polymers and Environment, v 10, Nos. ½, Plenum Publishing Corporation.

Cornish, K., et al., "Viral impermeability of hypoallergenic, low protein, guayule latex films", article 1991, pp. 434-437, J Biomed Mater Res, v 47, John Wiley & Sons, Inc.

Schloman, W., et al., "Characterization and performance testing of guayule latex", article, 1996, pp. 215-222, Rubber Chem Technol, v 69 (2).

Sibert et al., "This and That" [online], Winter Issue, 2004, Nebraska Department of Education, Career Solutions Training Group, pp. 1-8. [Retrieved on Oct. 20, 2005]. Retrieved from http://www.nde.state.ne.us/BMIT/ThisandThat/04WinterTNT.pdf.

"Rich Kid Smart Kid" [online], CASHFLOW Technologies, Inc., p. 1. [Retrieved on Jun. 12, 2006]. Retrieved from http://www.richkidsmartkid.com/index.html.

"Paying Bills, Microsoft Money2003" [online], Crater High School, Central Point, Oregon, p. 1. [Retrieved on Oct. 20, 2005]. Retrieved from http://www.cratercomets.com/csb/agenda/2002-2003/2ndNine/week8/money2003_1.htm.

Altizer et al., "Lesson 3: Check Writing" [online], Frankfort School, Frankford, West Virginia, pp. 1-4. [Retrieved on Jun. 12, 2006]. Retrieved from http://www.thesolutionsite.com/lesson/801/frankforde1A3.htm.

"TPP Sample Course Objectives" [online], pp. 1-3. [Retrieved on Oct. 20, 2005]. Retrieved from http://dmselpa.sbcss.k12.ca.us/Transition/TPPWebpage/03YearEnd/TPPCourse.html.

Norfleet, "Exchange Bank Helps Teach Kids At Middle School About Money" [online], Jefferson City News Tribune Online Edition, May 15, 2004, pp. 1-5. [Retrieved on Oct. 20, 2005]. Retrieved from http://newstribune.com/articles/2004/05/15/business/0515040003.txt.

"Career Technology—Career and Life Skills" [online], Jun. 15, 2001. [Retrieved on Oct. 20, 2005]. Retrieved from http://64.233.167.104/search?q=cache:n3hw2L7o6BwJ:www.gorham.k12.me.us/ghs.

"Paying Bills" [online], Money Instructor, pp. 1-5. [Retrieved on Oct. 20, 2005]. Retrieved from http://www.moneyinstructor.com/wsp/paybills.asp.

"Jump$tart Search" [online], The Jump$tart Coalition for Personal Financial Literacy, Washington, D.C., pp. 1-8. [Retrieved on Oct. 20, 2005]. Retrieved from http://www.jumpstart.org/mdb/browse.cfm?startrow=26.

"Writing Checks—Checking Account—Checkbook Lessons" [online], Money Instructor, pp. 1-5. [Retrieved on Oct. 20, 2005] Retrieved from http://www.moneyinstructor.com/checks.asp.

"Teacher Resources" [online], Practical Money Skills for Life, pp. 1-3. [Retrieved on Oct. 20, 2005]. Retrieved from http:www.practicalmoneyskills.com/English/at_school/teachers/innovative/0304b_tea.php.

"A Prime Reality: Credit Decisions and You" [online], TerraCare Software, Inc., pp. 1-2. [Retrieved on Oct. 20, 2005]. Retrieved from http://terracare.com/services/curricula.xml?ss=curricula_detail&id=G005.

"Education Programs" [online], National Endowment for Financial Education, p. 1. [Retrieved on Jun. 12, 2006]. Retrieved from http://www.nefe.org/pp./educationalprograms.html.

"Pennsylvania Academic Standards for Family and Consumer Sciences, Curriculum, Financial Champions" [online], Penn State College of Agricultural Sciences, Pennsylvania 4-H, pp. 1-2. [Retrieved on Jun. 12, 2006]. Retrieved from http://pa4h.cas.psu.edu/Curricula/FinancialChampions/Resources/StandardsFinChamp.pdf.

"What does LifeSmarts Teach Teens" [online], National Consumers League, Washington, D.C., p. 1. [Retrieved on Jun. 12, 2006]. Retrieved from http://www.lifesmarts.org/start/FAQ/teaches.htm.

Crew, "Virtual Enterprise" [online], Board of Education of the City of New York, pp. 1-5. [Retrieved on Jun. 12, 2006]. Retrieved from http://www.tnellen.com/schooll/ve.html.

* cited by examiner

Cable Company

List of Available Services

<u>Fees per Month*</u>

52 → Package 1 - Basic      $29.99 ← 54

52 → Package 2 - Plus      $45.99 ← 54

52 → Package 3 - Premium      $59.99 ← 54

56 → *Taxes not included

FIG. 3

Credit Card Company

Monthly Statement

Statement End Date: 2/3/2006

Sally Student: Account number 123456789
Credit Limit $1,500

| | |
|---|---|
| New Charges: | $563.95 |
| Finance Charges | 0.00 |
| Late Fees | 0.00 |
| ~~Total~~ Minimum Payment | $563.95 |
| | 45.04 |

Due Date: 2/12/2006

Summary of Terms
APR 14.99%
Late Fees $29

*SIMULATED BILL*

Credit Card Company Inc.
P.O. Box 1234
Nowhere, USA 12345

Stamp

Sally Student
1234 Apple Rd
Nowhere, USA 12345

Online Statement

Customer: Sally Student ← 96

Balance as of 2/28  $ 1,483.73

Transactions for the past 30 days

| Date | Activity | Debits | Credits | Balance |
|---|---|---|---|---|
| 28-Feb | Payroll Direct Deposit | | $ 800.00 | $ 1,483.73 |
| 27-Feb | PMT - Cable | $ 69.32 | | $ 683.73 |
| 18-Feb | PMT - Auto Loan | $ 190.00 | | $ 753.05 |
| 14-Feb | Payroll Direct Deposit | | $ 800.00 | $ 943.05 |
| 13-Feb | Service Fee - Returned Check/Unsufficient Funds | $ 39.00 | | $ 143.05 |
| 8-Feb | Service Fee - Below Minimum Balance | $ 19.00 | | $ 182.05 |
| 8-Feb | PMT - Credit Card | $ 563.59 | | $ 182.05 |
| 6-Feb | PMT - Gas and Electric | $ 35.00 | | $ 765.00 |
| 1-Feb | Opening Balance - Thank You | | $ 800.00 | $ 800.00 |

98

[ Return to Main ]

| Day | Manager Activity | Student Activity | Balance |
|---|---|---|---|
| 2/1 | Print and mail Bill #1 (Utility, $35.00, due 11 days) | Starting Balance $800 and can expect biweekly salary deposits of $800 | $ 800.00 |
| 2/2 | | | $ 800.00 |
| 2/3 | Print and mail Bill #2 (Credit card bill, balance $563.95, minimum payment $45.04, due 9 days) | Student Receive Bill #1 | $ 800.00 |
| 2/4 | | Student writes and mails check 1001 for Bill #1 | $ 800.00 |
| 2/5 | | Student Receive Bill #2 | $ 800.00 |
| 2/6 | Receive check 1001 and reconciles account | Student writes and mails check 1002 for balance of Bill #2 | $ 765.00 |
| 2/7 | Print and mail Bill #3 (Auto loan, $190.00, due 9 days) | | $ 765.00 |
| 2/8 | Receive check 1002 and reconciles account; Assess $19.00 minimum balance fee | | $ 182.05 |
| 2/9 | | Student Receive Bill #3 due in 7 days | $ 182.05 |
| 2/10 | | | $ 182.05 |
| 2/11 | | Student writes and mails check 1003 for Bill #3 | $ 182.05 |
| 2/12 | | | $ 182.05 |
| 2/13 | Receive check 1003; Mail insufficient funds notice to student; Debit account $39.00 returned check fee; Return check 1003 to Student | | $ 143.05 |
| 2/14 | Salary deposit - account credited $800 | | $ 943.05 |
| 2/15 | | Student Receive check 1003 and notice of insufficient funds | $ 943.05 |
| 2/16 | | Student writes and mails check 1004 for Bill #3 | $ 943.05 |
| 2/17 | | | $ 943.05 |

FIG. 11B

| Day | Manager Activity | Student Activity | Balance |
|---|---|---|---|
| 2/18 | Receive check 1004 and reconciles account | | $ 753.05 |
| 2/19 | | | $ 753.05 |
| 2/20 | | | $ 753.05 |
| 2/21 | Print and mail Bill #4 (Cable, $69.32, due 14 days) | | $ 753.05 |
| 2/22 | | | $ 753.05 |
| 2/23 | Print and mail reminder that rent of $700.00 is due in 9 days | Student Receive Bill #4 | $ 753.05 |
| 2/24 | | | $ 753.05 |
| 2/25 | | Student writes and mails check 1005 for Bill # 4; Student Receive rent reminder | $ 753.05 |
| 2/26 | | | $ 753.05 |
| 2/27 | Receive check 1005 and reconciles account | Student writes and mails check 1006 for rent | $ 683.73 |
| 2/28 | Salary deposit - account credited $800; Print and mail account statement | | $ 1,483.73 |
| 3/1 | Receive check 1006 and reconciles account | | $ 783.73 |
| 3/2 | | Student Receive account statement showing balance of $1,483.73 | $ 783.73 |
| 3/3 | Print and mail Bill #5 (Utility, $38.50, due 11 days) | | $ 783.73 |
| 3/4 | | | $ 783.73 |
| 3/5 | Print and mail Bill #6 (Credit card bill, balance $495.30, minimum payment $35.04, due 9 days) | | $ 783.73 |
| 3/6 | | Student Receive Bill #5 | $ 783.73 |
| 3/7 | | Student Receive Bill # 6 | $ 783.73 |
| 3/8 | | Student writes and mails checks 1007 and 1008 for Bills #5 and # 6 | $ 783.73 |
| 3/9 | Print and mail Bill #7 (Auto loan, $190.00 + $58 in fees, due 9 days) | | $ 783.73 |

FIG. 11C

| Day | Manager Activity | Student Activity | Balance |
|---|---|---|---|
| 3/10 | | | $ 783.73 |
| 3/11 | Receive checks 1007 and 1008 and reconciles account | Student Receive Bill #7 | $ 249.93 |
| 3/12 | | | $ 249.93 |
| 3/13 | | Student writes and mails check 1009 for Bill #7 | $ 249.93 |
| 3/14 | Salary deposit - account credited $800 | | $ 1,049.93 |
| 3/15 | Receive check 1009 and reconciles account | | $ 801.93 |
| 3/16 | | | $ 801.93 |
| 3/17 | | | $ 801.93 |
| 3/18 | | | $ 801.93 |
| 3/19 | | | $ 801.93 |
| 3/20 | | | $ 801.93 |
| 3/21 | | | $ 801.93 |
| 3/22 | Print and mail Bill #8 (Cable, $69.32, due 14 days) | | $ 801.93 |
| 3/23 | | | $ 801.93 |
| 3/24 | | Student Receive Bill #8 | $ 801.93 |
| 3/25 | Print and mail reminder that rent of $700 is due in 8 days | | $ 801.93 |
| 3/26 | | Student writes and mails check 1010 for Bill #8 | $ 801.93 |
| 3/27 | | | $ 801.93 |
| 3/28 | Salary deposit - account credited $800; Receive check 1010 and reconciles account | Student Receive rent reminder | $ 1,532.61 |
| 3/29 | Print and mail account statement | | $ 1,532.61 |
| 3/30 | | Student writes and mails check 1011 for rent | $ 1,532.61 |
| 3/31 | Receive check 1011 and reconciles account | Student Receive account statement showing balance of $1,532.61 | $ 832.61 |

METHODS, SYSTEMS, KITS AND COMPUTER USABLE MEDIA FOR SIMULATING FINANCIAL TRANSACTIONS

TECHNICAL FIELD

The present invention relates generally to methods, systems, kits and computer usable media for simulating financial transactions for education of students in effective management of personal finance.

BACKGROUND OF THE INVENTION

Since bank deregulation in the early 1980's, banks have adjusted their strategy to better compete on a national level. To grow and ward off acquisition in a consolidating industry, banks have steadily introduced fee increases as well as new types of fees resulting in an overly complicated and punitive banking system that generates more profits from fees than from the traditional business of lending.

This added complexity regarding fees is not unique to banking. For example, other financial institutions, such as those that offer credit cards, also have adopted a more aggressive fee strategy. Although this strategy is effective at increasing revenues, it disproportionally impacts certain populations of the consumer base. In particular, the large increases in bank revenues are largely funded by the fees charged to uneducated and inexperienced banking customers, as it is these customers who do not possess the knowledge and skills needed to avoid these fees.

Fees can largely be avoided by consumers who have knowledge of basic personal finance. Basic personal finance includes three skills: budgeting, cash flow management, and accounting. Budgeting involves comparing estimated expenses against estimated income. Cash flow management involves coordinating the timing of debits and credits so that one's cash balance is never negative and so that transaction costs are minimized. Accounting involves retrospectively evaluating expenses and income and comparing these against a budget to detect errors and identify opportunities for improved spending behavior.

Fees can be further reduced by learning additional skills. As financial and lending institutions offer a wider variety of products, often with more terms and conditions of use, the ability for a consumer to understand, evaluate, and compare these products is becoming more important. Consumers who possess the skill of appropriate product selection can most effectively use banks while incurring the fewest possible fees.

In addition, a person's credit score is becoming ever more important and can play a significant role in that person's ability to purchase certain items or live a desired lifestyle. Persons unfamiliar with the existence or importance of their credit score, and/or the factors which affect their credit score, can experience significant hardships and costs (often in the form of higher interest rates on debt) than persons who understand and take steps to effectively manage their credit score.

Also, in our modern world, many lenders are available to lend money to consumers. Such lenders include, for example, banks, student loan financing companies, check cashing companies, credit card companies, and pawn shops. Certain lenders provide more attractive terms than others, but persons unfamiliar with lender options can incur significantly more cost in borrowing money than persons familiar with lender options. Furthermore, persons with low credit scores will likely have fewer lenders to select from, and will accordingly pay more to borrow money than persons with higher credit scores. Additionally, many lenders impose fees which sophisticated borrowers can easily avoid, but which less sophisticated borrowers often find themselves trapped into paying.

Accordingly, a person having some sophistication as to banking, borrowing, purchasing, and investing can reap significant financial and non-financial rewards. However, it can be difficult for a child to learn such sophistication, particularly if that child's parents or guardian are not themselves empowered with such knowledge. It can also be difficult for an adult to learn such sophistication, as it is likely that such an adult is already burdened by bad financial habits and/or a low credit score. Additionally, conventional systems are often not easily used, accessible, or effective in providing such knowledge to children and/or adults.

SUMMARY OF THE INVENTION

In accordance with one embodiment of the present invention, a method of teaching personal financial skills to a student comprises providing a balance of simulated funds within a simulated bank account. Simulated bills are transmitted to a student on a periodic basis via at least one of a courier and an electronic transmission. At least some of the simulated bills are transmitted on different dates and impose different due dates. Simulated payments are received from a student corresponding to the simulated bills via at least one of a courier and an electronic transmission. The simulated payments are processed upon receipt and the balance of the simulated funds is reconciled within the simulated bank account to reflect the simulated payments.

In accordance with another embodiment of the present invention, a computer usable medium has encoded thereon a computer implemented method for simulating financial transactions. The method comprises providing a balance of simulated funds within a simulated bank account. Periodic transmission of simulated bills to a student and simulated payments from a student corresponding to the simulated bills are monitored. The balance of the simulated funds is adjusted to reflect the simulated payments. At least some of the simulated bills are transmitted on different dates via at least one of a courier and an electronic transmission and impose different due dates. The simulated payments are received via at least one of a courier and an electronic transmission.

In accordance with yet another embodiment of the present invention, a method of teaching personal financial skills to a student comprises providing a balance of simulated funds within a simulated bank account. A simulated deposit is received into the simulated bank account. The balance of the simulated bank account is reconciled to reflect the simulated deposit. A student is notified of a simulated expense from a simulated vendor. A request for disbursement regarding the simulated expense is received from a student via at least one of a courier and an electronic transmission. Simulated funds are disbursed from the simulated bank account to the simulated vendor in response to the request for disbursement. The balance of the simulated bank account is reconciled to reflect the disbursement of simulated funds.

In accordance with still another embodiment of the present invention, a system is provided for teaching personal financial skills to a student. The system involves a simulated bank account including simulated funds. The system facilitates transmission of simulated bills to a student on a periodic basis via at least one of a courier and an electronic transmission. At least some of the simulated bills are transmitted on different dates and impose different due dates. The system also facilitates receipt of simulated payments from a student corresponding to the simulated bills via at least one of a courier and an electronic transmission. The system involves processing of simulated payments upon receipt and reconciliation of the balance of the simulated funds within the simulated bank account to reflect the simulated payments.

In accordance with another embodiment of the present invention, a kit is provided for teaching personal financial skills to a student. The kit comprises materials for instructing and enabling a student to manage a simulated bank account and to send simulated payments in response to simulated bills.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION OF EMBODIMENTS

The present invention and its operation are hereinafter described in detail in connection with the views of FIGS. 1-10 and 11A-11C, wherein like numbers indicate the same or corresponding elements throughout the views. The present invention relates to teaching skills to students for use in managing their personal finances. Students can range in age from young children to grown adults, and the teaching environment can occur in a classroom setting, in a self-education setting, and/or in any of a variety of other settings. For example, a high school teacher could include such a method or system as part of a course curriculum where each of the students in the class is provided with training in effective management of personal finance. In another example, an adult student might personally subscribe via the internet or otherwise to such financial training.

Figure 1:
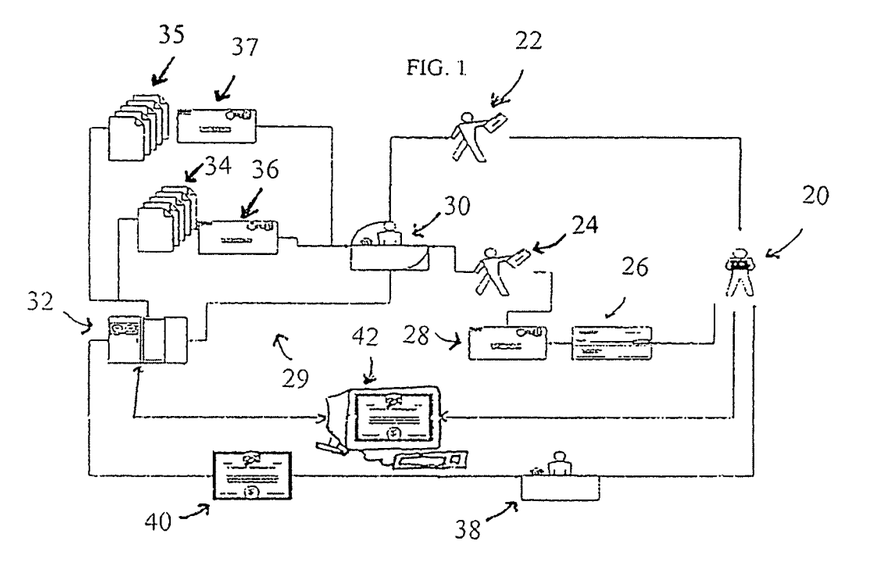
FIG. 1 is a flow diagram depicting operation of a method in accordance with one embodiment of the present invention.
Figure 2:
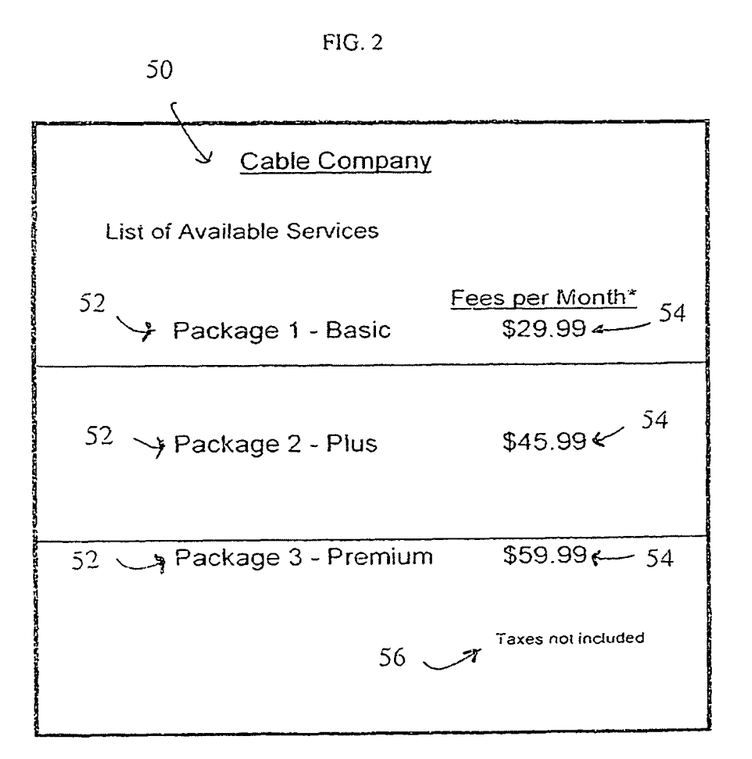
FIG. 2 depicts a list of available simulated services available to a student from a simulated vendor in accordance with one embodiment of the present invention.

Turning now to FIG. 1, operation of a method in accordance with one embodiment of the present invention is depicted. A manager 29 can coordinate operation of a method or system in accordance with one embodiment of the present invention. As shown in FIG. 1, the manager 29 can include a computer 32 and a clerk 30. The computer 32 can provide a database for storing information about students and simulated bank accounts. The clerk 30 can facilitate the transfer of at least some data to and from the computer 32. It will be appreciated that the clerk may comprise one or more persons. In an alternative embodiment, a manager 29 might include a computer 32 which is capable of implementing a method or system in accordance with one embodiment of the present invention in an entirely automated configuration and thus without any clerk 30. In yet another embodiment, a clerk 30 can implement a method or system in accordance with one embodiment of the present invention without any computer 32. In some embodiments, a management company might provide the role of the manager 29.

As shown in FIG. 1, the computer 32 can generate simulated bills 34 from simulated vendors which relate to simulated goods or services received by a student 20 from the simulated vendors. The simulated bills 34 can be placed into an envelope 36 which is addressed to the student 20 and which can be delivered to the student 20 by a courier 22. The courier 22 can comprise a postal worker, or some other delivery person. It will be appreciated that the envelope 36 can be addressed by the computer 32 so that the postal worker 22 can effectively locate the student 20. In this manner, it will be appreciated that the student 20 can receive the simulated bills 34 just as the student 20 would receive actual bills from real vendors. However, in another embodiment, the simulated bill 34 might be emailed or otherwise electronically transmitted to the student 20. The student 20 can therefore gain first-hand experience as to the manner and timing within which a bill is received after the student receives a good or service from a vendor.

Figure 3:
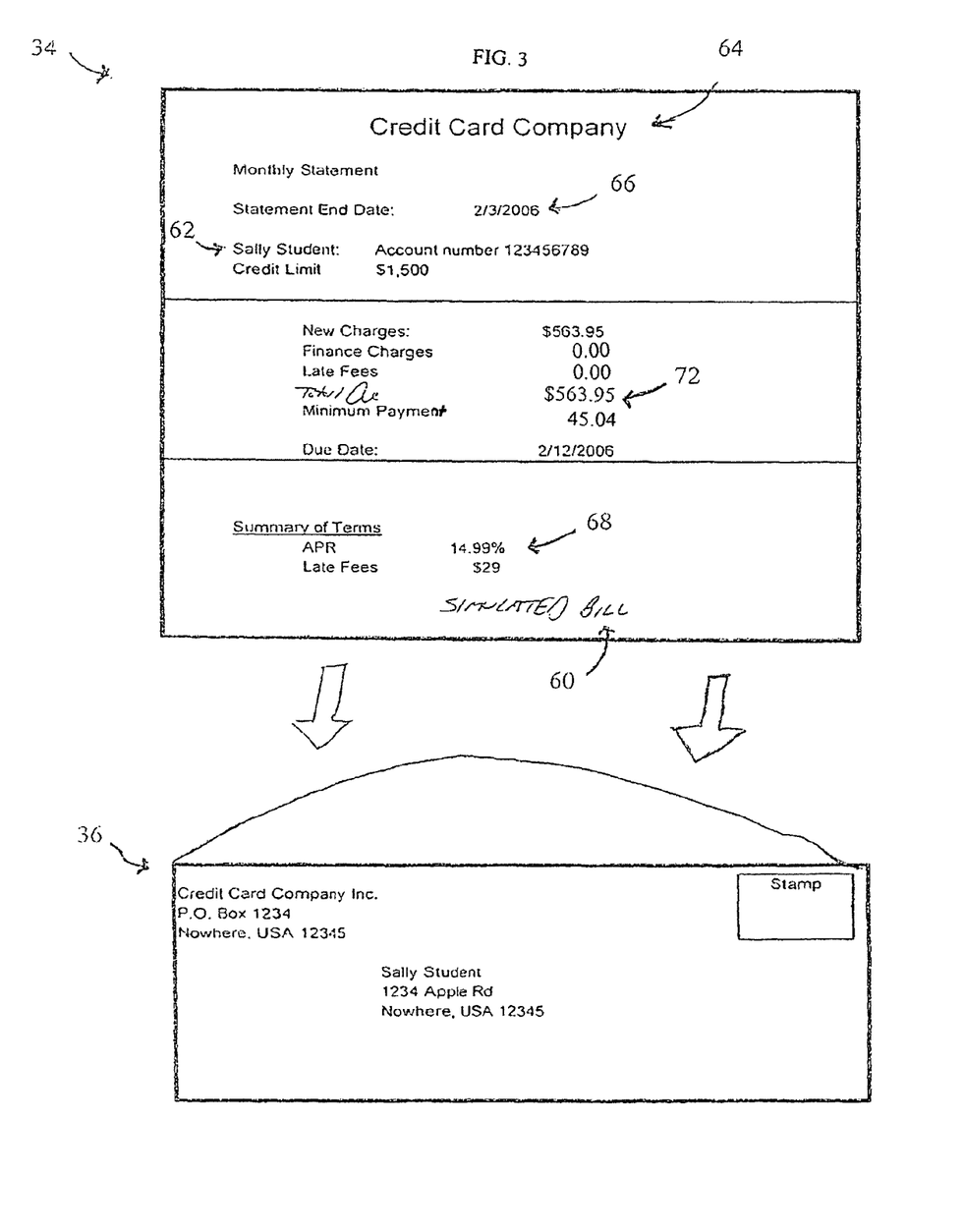
FIG. 3 depicts a simulated bill and a mailing envelope in accordance with one embodiment of the present invention.

FIG. 3 depicts a simulated bill 34 which might be received by the student 20 via a courier. The simulated bill 34 is shown to include a legend 60 which alerts the beholder that actual payment of real money is not required. The simulated bill 34 is also shown to include a student indicia 62, as well as an identification 64 of a simulated vendor. The simulated bill 34 can also include a date 66 and one or more terms of payment 68. The simulated bill 34 can also include a listing of simulated goods or services received by the student as well as a simulated amount due 72 corresponding to the simulated goods or services. FIG. 3 additionally depicts the envelope 35 in which the simulated bill 34 may arrive from the management company to the student.

Figure 11A:
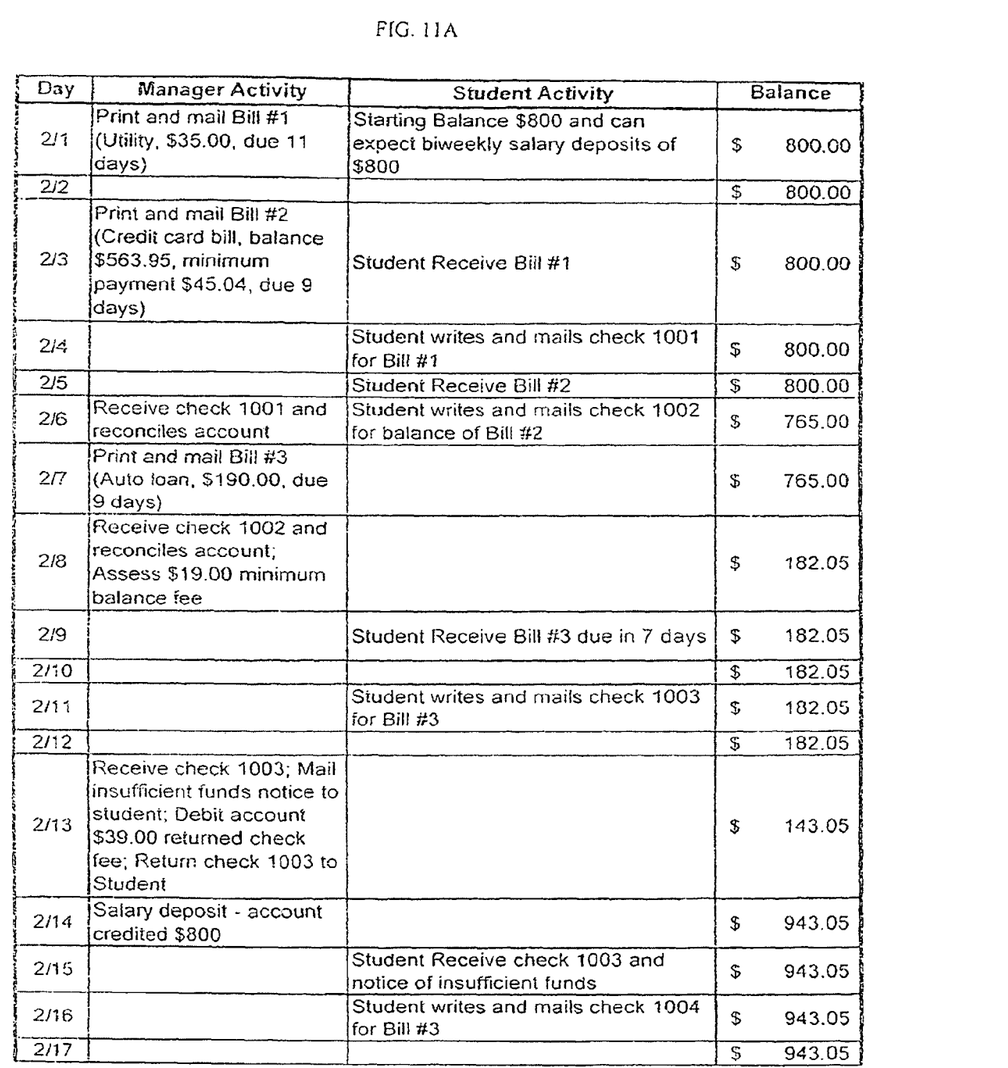
FIGS. 11A-11C is a timeline depicting operation of a method in accordance with one embodiment of the present invention.
Figure 11B:
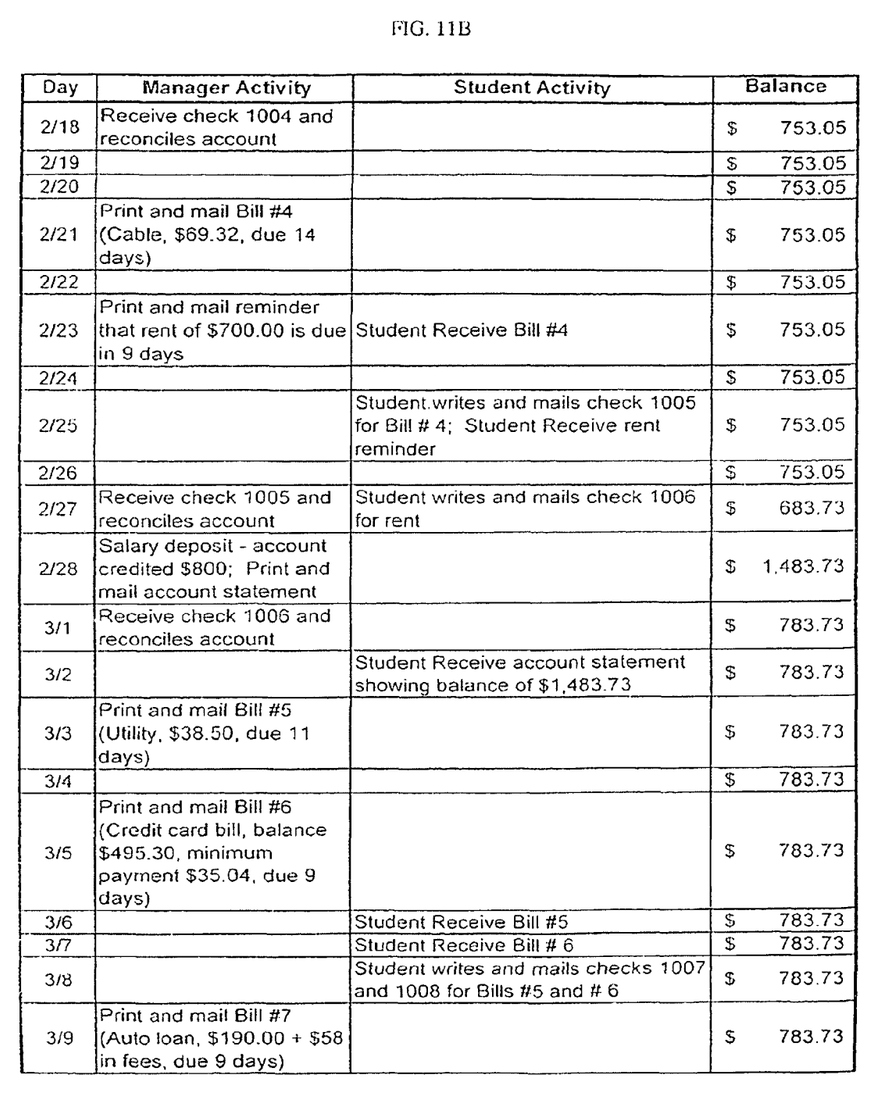
Figure 11C:
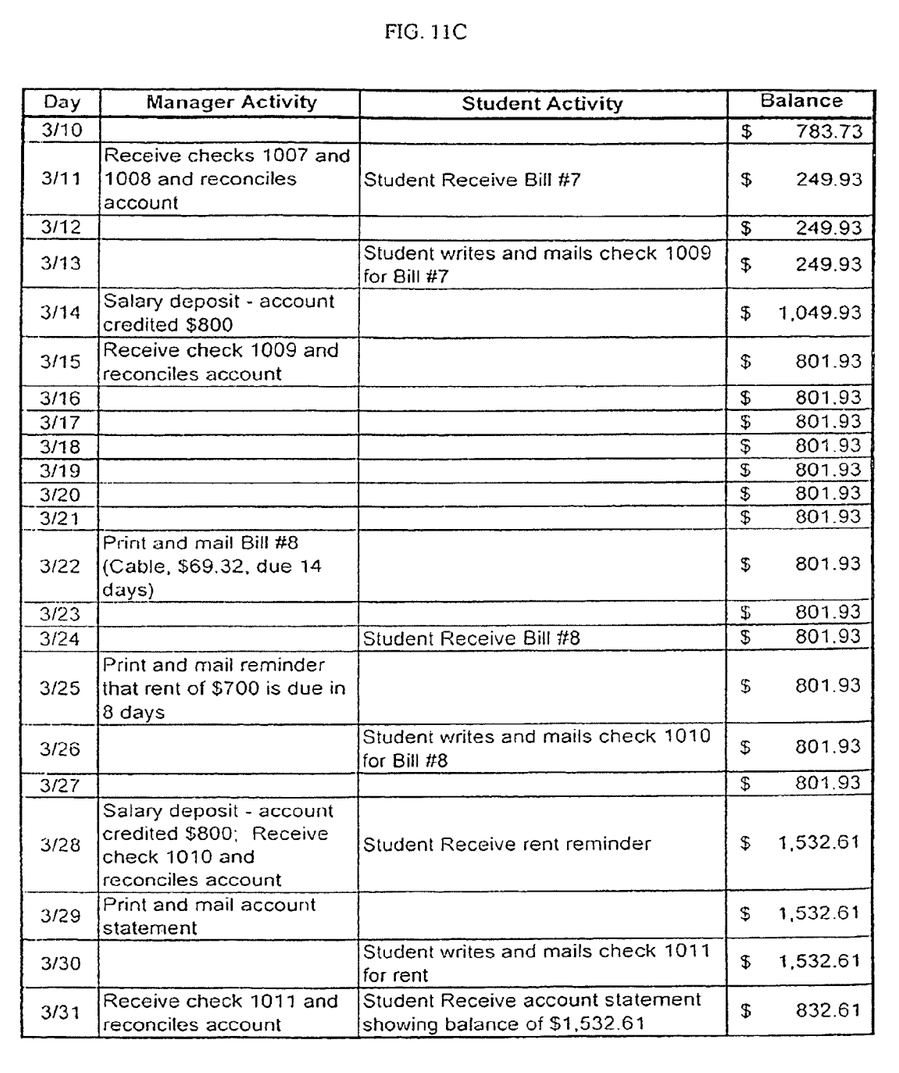

Upon receipt of the simulated bill 34 from the simulated vendor, the student 20 can verify that the simulated goods and/or services were purchased and that the charges are correct. If so, the student 20 can complete a simulated check 26, can place the simulated check 26 into an envelope 28, and can forward this envelope 28 to the manager 29 via a courier 24. It will be appreciated that the envelope 28 can be addressed to the manager by the student 20 or can be provided to the student 20 as a pre-addressed envelope. Upon receipt of the simulated check 26, the clerk 30 can update the computer 32 so that a simulated bank account corresponding to the student 20 and located within the computer 32 can be reconciled to reflect the payment of the simulated check 26. This process can repeat itself for multiple simulated bills 34 and corresponding simulated checks 26. It will also be appreciated that the time delay and variation in time delay associated with the transmittal of payments can approximate actual conditions found in real life (e.g., as shown in the examples of FIGS. 11A-11C). If the student 20 notices that the charges on the simulated bill 34 are not correct, the student 20 can call, write, or take some other appropriate action to communicate with the manager 29 for explaining the discrepancy so that the manager 29 can adjust the account accordingly (e.g., this can test a student's ability to carefully examine simulated bills).

Figure 4:
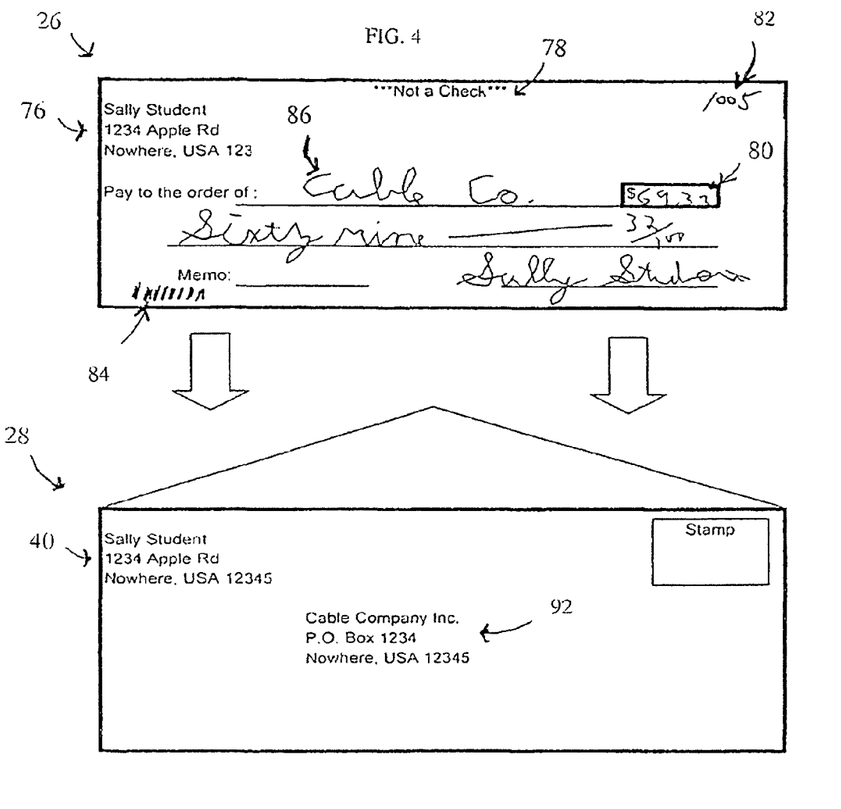
FIG. 4 depicts a simulated check and a mailing envelope in accordance with one embodiment of the present invention.

FIG. 4 depicts in further detail a simulated check 26 in accordance with one embodiment of the present invention. The simulated check 26 is shown to include a student indicia 76 and a legend 78. The legend 78 can indicate that the simulated check is not a real check so that the simulated check 26 is not inadvertently used for payment of real expenses. The simulated check 26 is also shown to include a simulated amount paid 80, a simulated check number 82, a location for listing the name of a simulated vendor 86 or other payee of the simulated check 26, and a bar code 84. It will be appreciated that the bar code 84 can comprise any type of computer readable symbol and can be used by the management company to more efficiently associate the simulated check 26 with the student's simulated bank account. FIG. 4 additionally depicts a simulated envelope 28 which can be used by a student to mail a simulated check 26 for payment of a simulated statement received from a simulated vendor. The envelope 28 can include student indicia 90 as a return address, and can additionally include an address for a simulated vendor 92. It will be appreciated that all addresses corresponding to the simulated vendors can be directed to the management company so that the management company can receive the simulated checks or other simulated payments.

Returning to FIG. 1, the computer 32 can also keep track of simulated bank accounts and can generate simulated statements 35 which provide the student 20 with a detailed accounting of recent transactions as well as the current balance of the simulated bank account. In one embodiment of the present invention, a simulated statement 35 can be placed into an envelope 37 which is addressed to the student 20 and which can be delivered to the student 20 by a courier 22. In another embodiment, a simulated statement can be provided electronically (e.g., via the online access port 42 described below) or can be provided to a teacher (e.g., 38 described below) for distribution to the student 20. The simulated statements 35 might be mailed to the student 20 on a periodic basis, such as weekly or monthly. However, the simulated statements might alternatively be provided to a student for online viewing.

Figure 5:
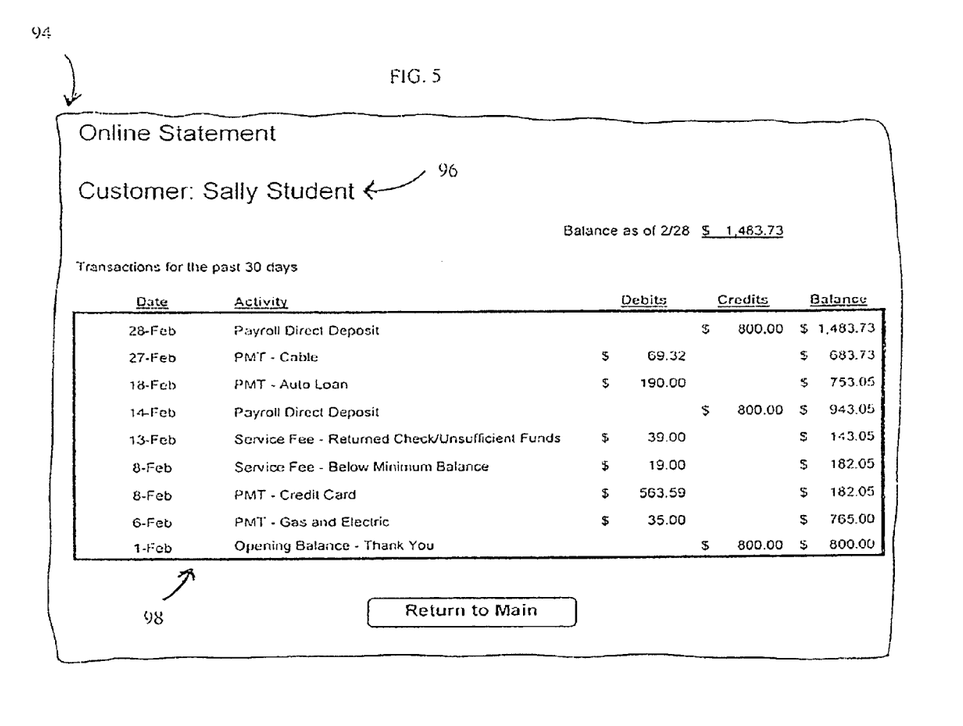
FIG. 5 is a screen shot displaying a simulated online statement in accordance with one embodiment of the present invention.

The manager 29 can support an online access port 42 (e.g., shown in FIG. 1 as a computer having a screen). The online access port 42 can be periodically accessed by the student 20, such as via the internet, in order that the student 20 can visualize in real time the balance of the simulated bank account maintained within the computer 32. An example of an online statement 94 is depicted in FIG. 5. The online statement 94 is shown to include a student indicia 96 which lists the student's name and/or identification number, a current balance 97 for the simulated bank account, as well as a transaction summary 98 listing recent transactions and balances for the simulated bank account.

The online access port 42 can also be used to electronically communicate simulated bills (e.g., like 34) to a student 20 without use of a courier 22. The online access port 42 can also be used by the student to make payments to simulated vendors in response to simulated bills 34, and without any need for use of simulated checks or couriers (e.g., 24). In particular, the student 20 might use the online access port 42 for an online bill pay function as shown, for example, in the screen shot 100 of FIG. 6. When using the online bill pay screen 100, the student 20 can use the simulated vendor selection 104 to indicate which of the simulated vendors is to receive a payment. The student 20 can then use the simulated payment amount selection 106 to indicate the amount of funds for payment to the simulated vendor. The student 20 can use the date of payment selection 112 to indicate the date upon which the simulated payment is to be made to the simulated vendor. Upon completion of these selections, the student 20 can use the control button 110 to finalize the transaction. The control button 108 can be used at any time prior to this finalization to cancel the transaction.

Figure 6:
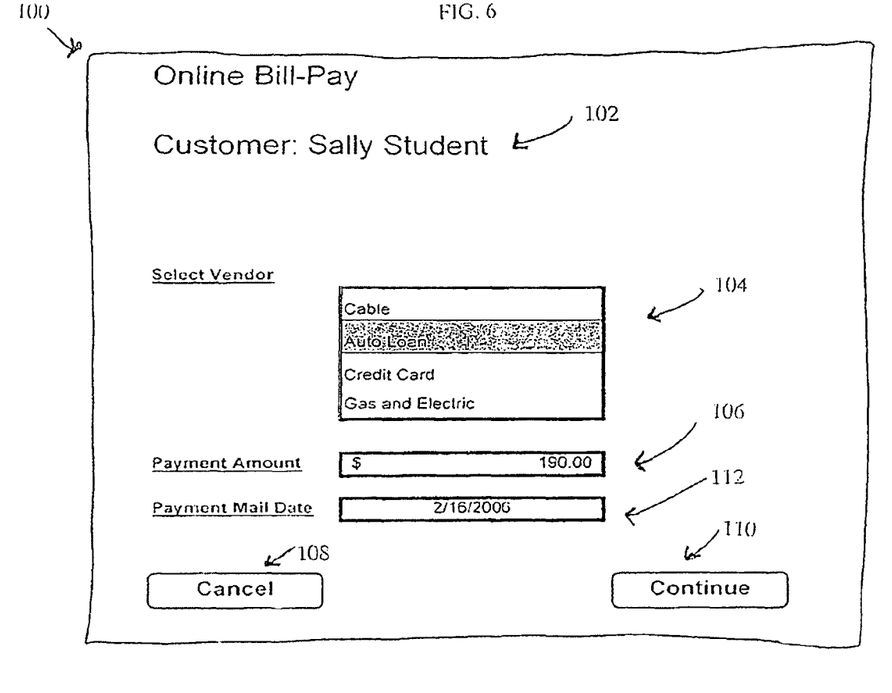
FIG. 6 is a screen shot displaying on-line bill paying capabilities in accordance with one embodiment of the present invention.
Figure 9:
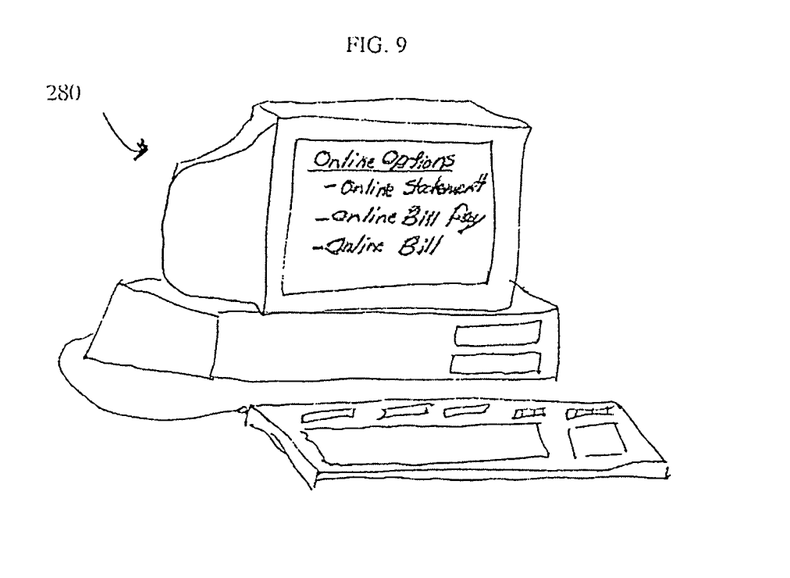
FIG. 9 is a perspective view depicting a computer in accordance with one embodiment of the present invention and displaying multiple online options.
Figure 10:
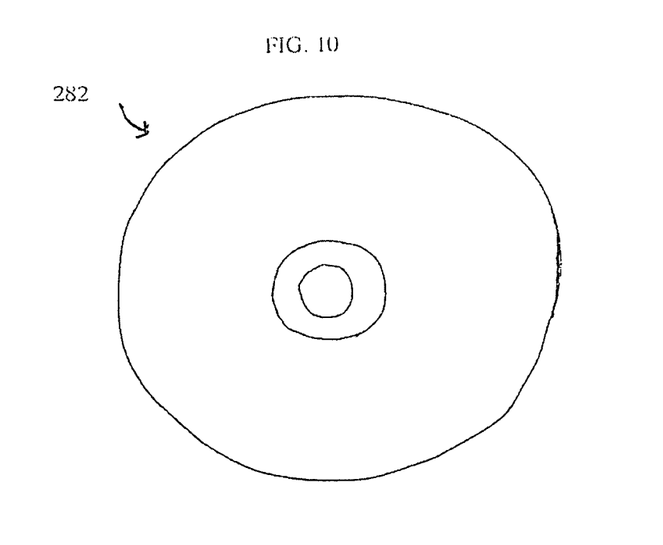
FIG. 10 is a perspective view depicting a compact disc ("CD") in accordance with one embodiment of the present invention.

In one embodiment of the present invention, the student can access the online access port 42 through an internet browser located upon a personal computer. For example, FIG. 9 depicts a computer 280 displaying a menu screen of online options which may be available to a student in accordance with one embodiment of the present invention. In particular, as depicted in FIG. 9, a student is shown to be capable of accessing an online statement (e.g., as shown in FIG. 5), view a simulated bill online, or facilitate online payment of a simulated bill (as shown in FIG. 6).

Accordingly, while one embodiment of the present invention involves use of a courier to facilitate transmission of simulated bills 34 and simulated statements 35 to a student 20 and/or simulated checks 26 from a student 20 (as shown in FIG. 1), it should be appreciated that other embodiments of the present invention can involve one or more simulated bills, statements and/or payments being transmitted to or from a student entirely through electronic mechanisms (e.g., an internet website computer and/or email) and without use of a courier. By providing an on-line access port 42, it will be appreciated that a student can receive valuable experience as to electronic management of personal finance, a skill that is quickly becoming more important as banks and vendors are encouraging customers, often through incentives, to conduct business electronically and without the use of paper.

The manager 29 can also provide the student 20 with a performance parameter 40. The performance parameter 40 can indicate the level of success with which the student 20 has handled the simulated bank account(s) and simulated vendors (e.g., simulated credit card companies) over a period of time. For example, the performance parameter 40 can indicate or be based upon such information as the number of late payments submitted by a student 20, the number and amount of bank and vendor service fees incurred by the student, the amount of interest accrued in the simulated bank account, whether the student correctly identified erroneous charges, whether the simulated payments by the student were accurate, whether the student selected the best simulated vendors, whether the student made wise decisions in expending any discretionary income, and a host of other information. In other embodiments, the performance parameter 40 can provide a grade or can provide a comparative parameter (e.g., a rank) indicating how a particular student performed with respect to other students within a class or group. The performance parameter 40 might additionally or alternatively provide a student with a simulated credit score that is calculated based upon the student's management of the simulated bank account and simulated bills over a period of time.

The performance parameter 40 can be provided in paper form and/or can be provided electronically such as via online access. In certain embodiments, the performance parameter 40 can be provided to a teacher 38, whereby the teacher 38 can provide feedback to the student 20 based thereon. This feedback from the teacher 38 to the student 20 can comprise a grade, although it might alternatively comprise a reward or other feedback. In alternative embodiments, the performance parameter 40 can be provided directly to the student 20. In certain circumstances, the manger 29 might provide a prize or other incentive to students having impressive performance parameters. The prize or incentive may or may not correspond in value with a student's performance relative to other students and/or what is perceived as being the best possible performance under the circumstances.

In accordance with one embodiment of the present invention, through a process of receiving simulated bills and making simulated payments, a student can be educated as to effective management of personal finance. Such a method can involve multiple simulated bills being transmitted to the student on different dates so that the student receives those simulated bills on different dates, in order to simulate a real life schedule of receiving bills. Likewise, respective simulated bills impose different due dates so that a student must initiate payments for those simulated statements on different dates. Failure by a student to make a payment for a particular simulated statement by a required due date can result in penalty fees charged to the student. In deciding whether or when to make a simulated payment in response to a simulated statement, a student would likely consider such things as the balance of funds within the student's simulated bank account, the amount of funds indicated by the simulated statement, and the terms and conditions imposed by the simulated vendor and by the bank.

In accordance with one embodiment of the present invention, a high school teacher can enroll her students in a personal finance training system. This enrollment can occur via a form or other document sent by the teacher to a management company, or can alternatively be conducted electronically through an on-line sign up sheet provided by the management company. The teacher's school, the teacher, and/or the student may be assessed a one-time or recurring fee by the management company to participate in this training. Upon registration, a packet may be sent to each of the students which are enrolled in the teacher's class. The packet may be sent electronically, although in one embodiment, the packet may comprise an envelope sent to the student directly (e.g., through a postal system) or through the student's teacher.

The packet can include a variety of information. For example, the packet can include a listing of simulated vendors and a schedule which indicates which simulated vendors will send simulated bills to a student, when those simulated bills are likely to arrive to the student, and a dollar range within which those simulated bills will likely fall. Other documentation within the packet may describe terms and conditions for each of the simulated vendors. For example, certain simulated vendors may offer incentives to students to make simulated payments early in response to simulated bills. Conversely, some simulated vendors may impose late fees or charges if simulated payments are received late. Other simulated vendors may disrupt service if simulated payments are received late. Still other simulated vendors may report late simulated payments to a credit service, thereby resulting in a reduction to a student's credit rating. Further documentation within the packet can describe terms and conditions of the simulated bank account, and may even provide terms and conditions for multiple different bank accounts which a student may select between. Once a student receives his packet and reviews the packet, the student can, in some circumstances, select which type of bank account he would like. This selection can be made via a written request transmitted by a courier, or electronically, or via a teacher.

The packet may also include a simulated checkbook enclosing multiple simulated checks (e.g., 26). The packet could also include stamps and/or envelopes for mailing the simulated checks. The packet may also include software (e.g., which can be placed on computer readable media such as a compact disc shown in FIG. 10) to facilitate a student's online access or banking with the management company. However, special software might not be necessary to facilitate this online access, but the student may undertake this access through an internet portal or website as is customary of many conventional online banking systems.

The packet can also include general instructions for participation in the training system. It will be appreciated that a management company might also provide a student with an ability to electronically access (e.g., via a website) the information within the packet, and perhaps additional information, via a website. The additional information on the website may include instructional materials, background reading, simulations, or other information which may help a student to learn about effective management of personal finance.

Figure 8:
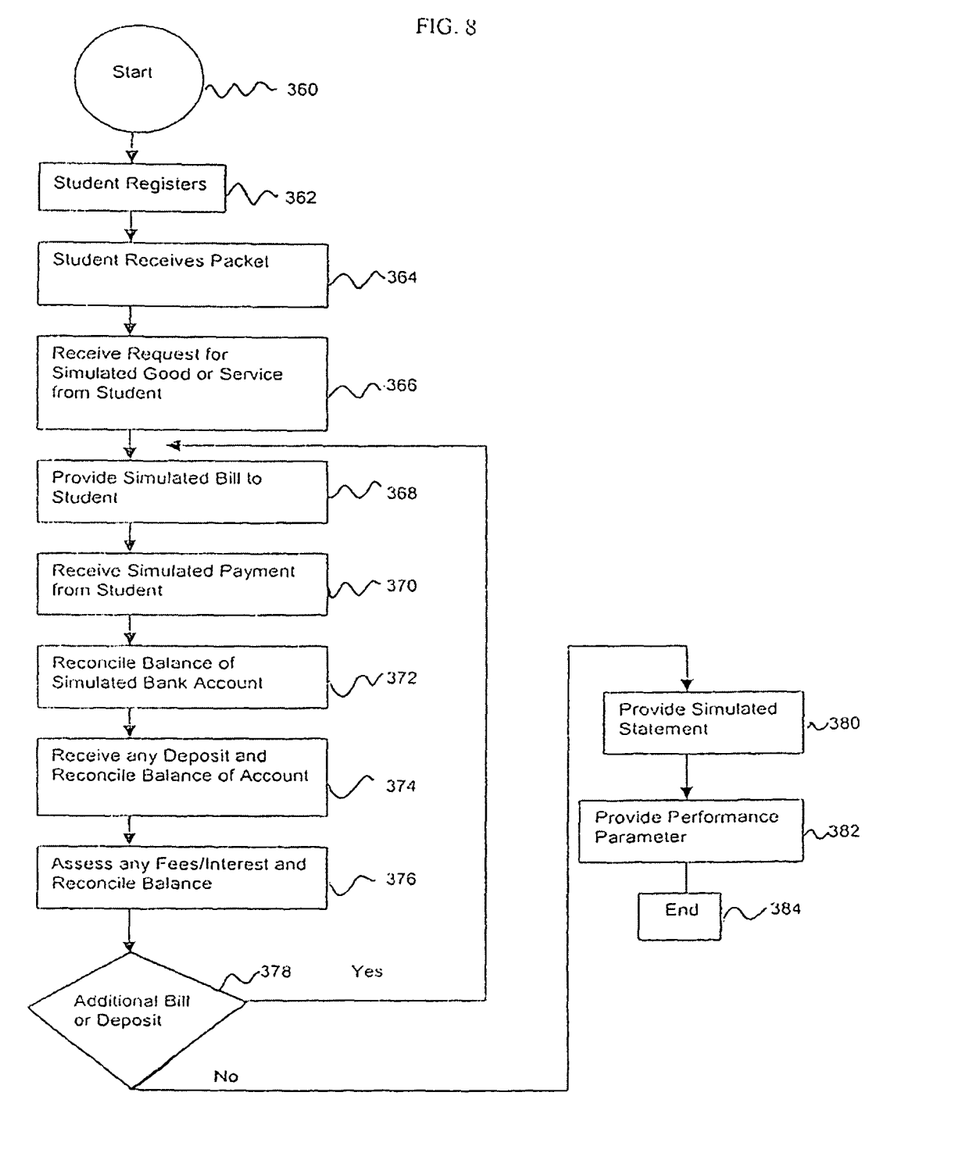
FIG. 8 is a flowchart depicting operation of a method in accordance with yet another embodiment of the present invention.

FIG. 8 depicts operation of certain aspects of a method in accordance with one embodiment of the present invention. The method starts at step 360 and a student is registered, such as by a teacher, at step 362. The student receives a packet at step 364. In certain circumstances, a student may be given an opportunity to request simulated goods or services from a simulated vendor, as shown at step 366. This request for simulated goods or services may occur via a courier or via an online instruction. For example, referring to FIG. 2, a student might be provided with a simulated list 48 which provides a list of simulated services 52 available from a simulated vendor 50 and the simulated costs 54 thereof, and may additionally provide terms 56 which are common for dealing with the simulated vendor 50. The simulated list 48 can be provided within a packet the student receives initially, or may be transmitted to the student via a courier or electronic service. The student may be instructed that he or she may or must purchase certain services from one or more of such lists. In another embodiment of the present invention, however, the student might not be given the option as to which simulated goods or services he purchases from simulated vendors, but those simulated goods or services might be pre-selected for the student by the management company. In such circumstance, it will be appreciated that multiple students within a same class might be pre-selected to receive the same simulated goods or services from the same simulated vendors in order that a teacher can more easily compare the manner in which her students responded to the same simulated bills received for those services. In such circumstance where a student is given the option to purchase certain items (e.g., clothing, medical, utilities, entertainment, gadgets, food, car payments, house payments, gasoline, repairs, gifts), a student can be rewarded or penalized (e.g., by varying the next simulated monthly income and/or affecting the student's grade) based upon the decisions made by the student in this regard.

The management company can provide a simulated bill to a student, as shown at step 368. The student can then make a simulated payment in response to the simulated bill, and the management company can receive the simulated payment from the student, as shown at step 370. As indicated previously, this simulated payment can be effected by simulated check or online payment. Upon receipt of the simulated payment from the student, the management company can reconcile the balance of the simulated bank account, as shown at step 372.

It will be appreciated that training in personal financial management using simulated real life billing and payment practices as discussed herein can occur over many weeks or months. As such, in order to fully simulate real life experiences, a student might receive a simulated paycheck or other deposit into the simulated bank account from time to time, as shown at step 374 in FIG. 8. The simulated paycheck or other deposit might be sent to a student via a courier as a simulated check, whereby the student must then send this check via a courier into the management company. However, in an alternative embodiment, the student may receive payroll or other funds as a direct deposit into the simulated bank account. In either circumstance, upon receipt of the deposit into the simulated bank account, the balance of the simulated bank account is reconciled accordingly.

Depending upon the terms of the simulated bank account and the manner in which the student has handled his financial affairs, the management company might withdraw fees and/or add interest to the simulated bank account, as shown at step 376. Simulated bank fees can include, for example, a simulated account maintenance fee, a simulated overdraft fee, a simulated minimum balance fee, a simulated wire transfer fee, and a simulated stop check fee. Any of a host of other simulated bank fees may also be withdrawn from the simulated bank account from time to time to correspond with the status of the simulated bank account and/or management of the funds within the simulated bank account by the student.

Throughout a method or system in accordance with one embodiment of the present invention, a student may pay multiple additional bills and/or receive multiple additional deposits, wherein such activities can result in repeating some or all of the foregoing steps, as shown at step 378. However, when the exercise is completed and the student has received all simulated bills, and has had a predetermined amount of time to pay those bills, the management company can provide a performance parameter, shown at step 382, to a student or his teacher. However, it will be appreciated that a student may be provided with one or more additional performance parameters at other times during the simulation (e.g., as midterm feedback). It will also be appreciated that the student may be provided with one or more simulated statements at any time, and perhaps at multiple times, during the process, as shown at step 380, for example. The method can then end at block 384.

Figure 7:
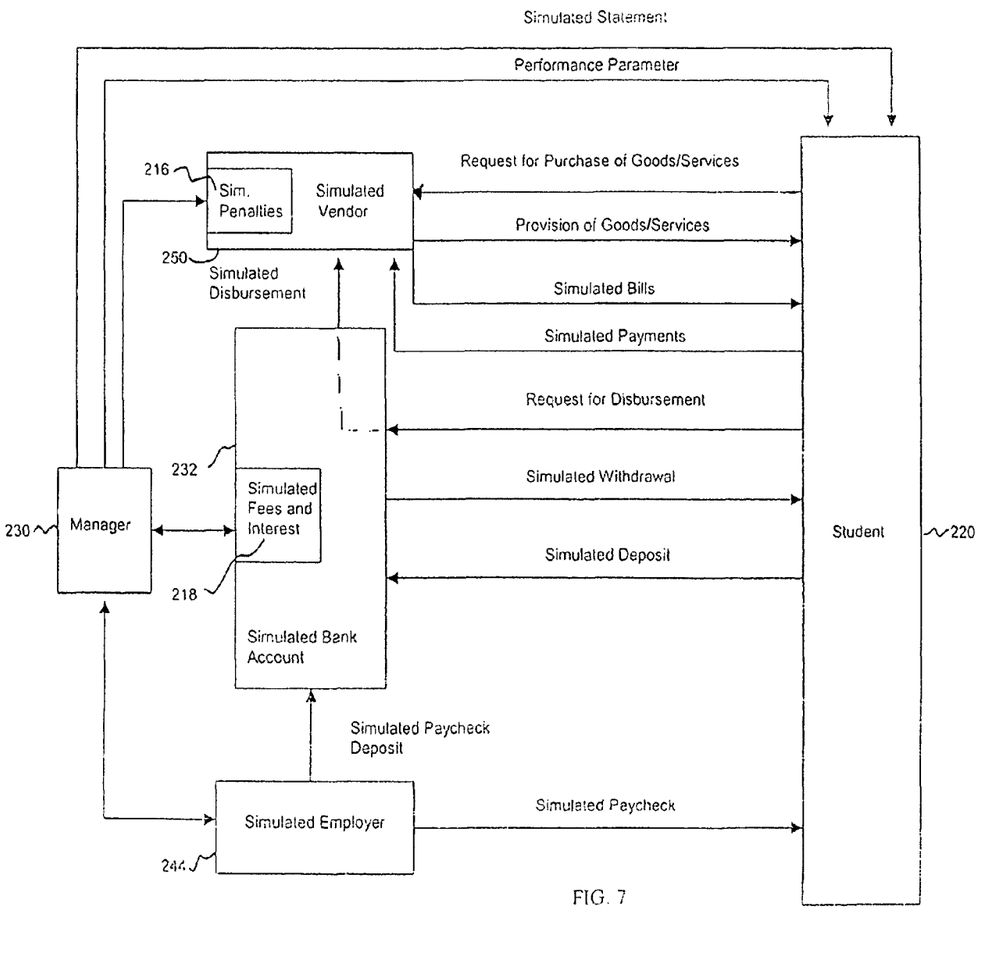
FIG. 7 is a flow diagram depicting operation of a method in accordance with another embodiment of the present invention.

FIG. 7 depicts a flow diagram depicting the operation of a method in accordance with another embodiment of the present invention. A student 220 is shown to be capable of requesting goods or services for purchase from a simulated vendor 250. The simulated vendor 250 is shown to provide those goods or services to the student 220 and to then send simulated bills to the student 220. The student 220 can then send a simulated payment directly to the simulated vendor 250, or could alternatively send a request for disbursement to a simulated bank account 232, which then makes a simulated disbursement to the simulated vendor 250. For example, when the student 220 drafts a check and sends that check to the simulated vendor 250, that check could be considered as either a simulated payment to the simulated vendor 250, or could alternatively be considered as a request for disbursement to the simulated bank account 232 which then provides a simulated disbursement to the simulated vendor 250. The student 220 can also make simulated withdraws from the simulated bank account 232 in order to effectuate simulated payments to the simulated vendor 250, or could alternatively make simulated withdraws to make other payments required or desired by the student 220. The student can also make simulated deposits of simulated funds acquired from time to time by the student 220 into the simulated bank account 232.

A simulated employer 244 can provide simulated paycheck deposits into the simulated bank account 232, or could alternatively provide simulated paychecks to the student 220, whereby the student 220 can then make simulated deposits into the simulated bank account 232 of the simulated paychecks. A manager 230, such as one or more persons and/or computers, can maintain communication with each of the simulated vendor 250, the simulated bank account 232, and the simulated employer 244, and can in turn control the actions of each of those entities with respect to the student 220. For example, the manager 230 can control the imposition of simulated fees and/or interest 218 at the simulated bank account 232 to reflect terms and conditions of the simulated bank account 232 being implemented in response to activity by the student 220. Likewise, the manager 230 can interact with simulated vendor 250 in order to impose simulated penalties or incentives 216 as appropriate based upon conduct of the student 220 and submission of simulated payments to the simulated vendor 250. The manager 230 can also provide simulated statements to the student 220 via a courier or electronic transmission, and can also provide a performance parameter either directly or indirectly to the student 220.

FIGS. 11A-11C depict a timeline of activities which can occur in accordance with one embodiment of the method of the present invention, wherein the activities of a student and management company are depicted by day, along with corresponding effects upon the simulated balance within a simulated bank account. It will be appreciated that the items depicted and described in this timeline provide mere examples, and could alternatively be accomplished in any of a variety of alternative fashions or arrangements.

As previously indicated, a student may have the option to choose between multiple types of bank accounts to serve as the simulated bank account. For example, one type of bank account may have no minimum fee requirement, but may pay no interest for money maintained within the simulated bank account. An alternative bank account may have a small minimum balance requirement, but may pay interest. Another alternative bank account may have a higher minimum balance requirement, but may include other features such as free overdraft protection and no service fee. Similarly, a student may be given a choice between different vendors for the same service. For example, one cable company may offer a lower monthly fee than another cable company, but may impose a higher penalty if the payment is not timely received from the student. Accordingly, it will be appreciated that a method or system in accordance with one embodiment of the present invention can teach a student as to the importance of making wise decisions as to choosing banks and vendors.

By providing simulated bills to a student on different dates, methods in accordance with one embodiment of the present invention can effectively simulate real life personal financial situations, and can accordingly teach students to make value decisions as to which bills to pay first. Accordingly, a student can learn through this practical experience as to how best to avoid penalties and fees arising from late payment and how to review the terms and conditions of vendors and banks in order to locate services and bank accounts that most effectively align with the financial needs of the student. By familiarizing the student with a need to review terms and conditions of vendors and banks, it will be appreciated that a student can learn valuable financial skills which will help him to conserve his personal finances in the market place. It will be appreciated that simulation creates a safe environment for students to learn from mistakes that would otherwise cost a student a significant amount in fees, damage to their credit score, and possibly a bankruptcy.

As a system in accordance with an embodiment of the present invention can generate and account for all of a student's simulated income and expenses, it will be appreciated that the system can produce a statement of simulated income (e.g., similar to a W-2 form) that can be used to facilitate the teaching of a student to prepare any required tax reporting forms. The system can also be used to teach students about tax ramifications of everyday financial decisions. For example, the system can present a student with a selection of simulated expenses and/or simulated loan options, wherein certain of the options provide tax advantages as compared to other options. As one particular example, a student purchasing a simulated car can be given the option to borrow money through either an auto loan or a home equity loan. As the interest on the home equity loan may be tax deductible, selection of the home equity loan for financing this simulated purchase may provide a significant financial advantage to the student as compared to the auto loan. The performance parameter can, in such circumstance, reflect whether a student's decisions when participating in the simulation made good sense from a tax perspective. It will also be appreciated that the system can assign categories to simulated expenses to facilitate teaching of tax laws, specifically with respect to which expenses are considered tax deductible.

As can be understood, the methods, routines, and the other functionalities described herein can be implemented using software, firmware, and/or associated hardware for carrying out the desired tasks. For instance, the various functionalities described can be programmed as a series of instructions, code, files, or commands using general purpose or special purpose programming languages or programs, and can be executed on one or more general purpose or special purpose computers, processors, other control circuitry, or networks.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A computer-executable program tangibly embodied on a non-transitory computer readable medium, the program encoding a computer implemented method for teaching effective management of personal finance through simulated financial transactions, the method comprising:

providing a balance of simulated funds within a simulated bank account; generating and causing transmission of a plurality of simulated bills to a student, wherein at least some of the simulated bills are transmitted on different dates via at least one of a courier and an electronic transmission and impose different due dates;

processing simulated payments from the student, wherein the simulated payments are received via at least one of a courier and an electronic transmission;

monitoring, the payment amounts and payment receipt dates of simulated payments from the student and reconciling the simulated payments corresponding to amounts and due dates of the simulated bills and adjusting the balance of the simulated funds to reflect the simulated payments;

generating statements on a periodic basis for a predetermined period and then causing transmission of the statements to the student via at least one of a courier and an electronic transmission each of the statements indicating transactions for the predetermined period and the balance of the simulated funds at the time that the each of the statements is generated; and wherein at least one of a simulated bill and the statement includes at least one discrepancy to be challenged by the student.

2. The computer-executable program tangibly embodied on a computer readable medium of claim 1, wherein the method further comprises generating statements on a periodic basis for a predetermined period and then causing transmission of the statements to the student via a courier, each of the statements indicating transactions for the predetermined period and the balance of the simulated funds at the time that the each of the statements is generated.

3. The computer-executable program tangibly embodied on a computer readable medium of claim 1 wherein the method further comprises generating statements on a periodic basis for a predetermined period and then causing transmission of the statements to the student via an electronic transmission, each of the statements indicating transactions for the predetermined period and the balance of the simulated funds at the time that the each of the statements is generated.

4. The computer-executable program tangibly embodied on a computer readable medium of claim 1, wherein the method further comprises the student selecting among simulated vendors from which to receive simulated bills, the vendors having at least one of different prices and different payment terms.

5. The computer-executable program tangibly embodied on a computer readable medium of claim 4, wherein the different terms include at least one of penalties for late payment and incentives for early payment.

6. The computer-executable program tangibly embodied on a computer readable medium of claim 1, wherein the simulated bank account includes at least one of fees associated with the account, minimum account balance requirement, and interest paid on the account balance.

7. The computer-executable program tangibly embodied on a computer readable medium of claim 1, wherein the method further comprises the student selecting among simulated types of bank accounts which include at least one of fees associated with the account, minimum account balance requirement, and interest paid on the account balance.

8. The computer-executable program tangibly embodied on a computer readable medium of claim 1, wherein the method further comprises assigning the student a simulated employer from which the student receives a recurring paycheck deposit to the simulated bank account at predetermined time intervals.

9. The computer-executable program tangibly embodied on a computer readable medium of claim 1, wherein the method further comprises providing a parameter, in addition to the account balance, indicative of the student's performance in managing the simulated funds.

10. The computer-executable program tangibly embodied on a computer readable medium of claim 9, wherein the parameter is derived from at least one of the number of late payments submitted by the student, the number and amount of bank and vendor service fees incurred by a student, the amount of interest accrued in the simulated bank account, whether the student correctly identified erroneous charges, whether the simulated payments by the student were accurate, whether the student selected the best simulated vendors, and how the student expended any discretionary income.

11. The computer-executable program tangibly embodied on a computer readable medium of claim 9, wherein the method comprises participation by a plurality of students and using the parameter to compare the students' relative performance in managing the simulated funds.

* * * * *